J. S. LEACH.
WIRELESS RECEIVING APPARATUS.
APPLICATION FILED DEC. 12, 1913.

1,136,683.                                  Patented Apr. 20, 1915.

Witnesses:
John E. Prager
A. Worden Gibbs

Inventor
Joseph S. Leach
By his Attorney
Beak F. Schuetz

UNITED STATES PATENT OFFICE.

JOSEPH S. LEACH, OF BROOKLYN, NEW YORK.

WIRELESS RECEIVING APPARATUS.

1,136,683. Specification of Letters Patent. Patented Apr. 20, 1915.

Application filed December 12, 1913. Serial No. 806,168.

*To all whom it may concern:*

Be it known that I, JOSEPH S. LEACH, a subject of the King of Great Britain, and a resident of Brooklyn, in the county of Kings and State of New York, have invented certain new and useful Improvements in Wireless Receiving Apparatus, of which the following is a specification.

The invention relates to receiving apparatus, more particularly such as is employed in the wireless transmission of intelligence.

The apparatus is of the telephone type of receiver; and with such, the intensity of the signal emitted by the receiver is a function of the distance between the stations.

It is, therefore, desirable to provide means whereby the receiving apparatus may be adjusted to properly respond to the signal sent; and the present invention has for its object to provide such receiving apparatus with a simple and accurate adjusting device by means of which the distance between the diaphragm and magnet poles may be suitably varied to correspond to the different distances.

The nature of the invention will be best understood when described in connection with the accompanying drawings, in which—

Figure 1:
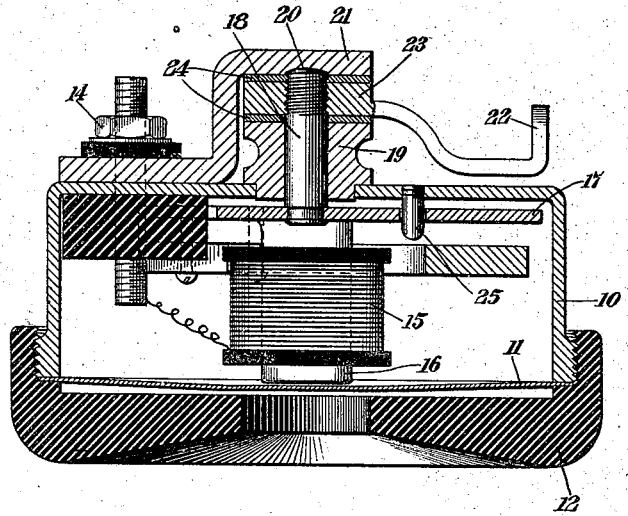
Figure 2:
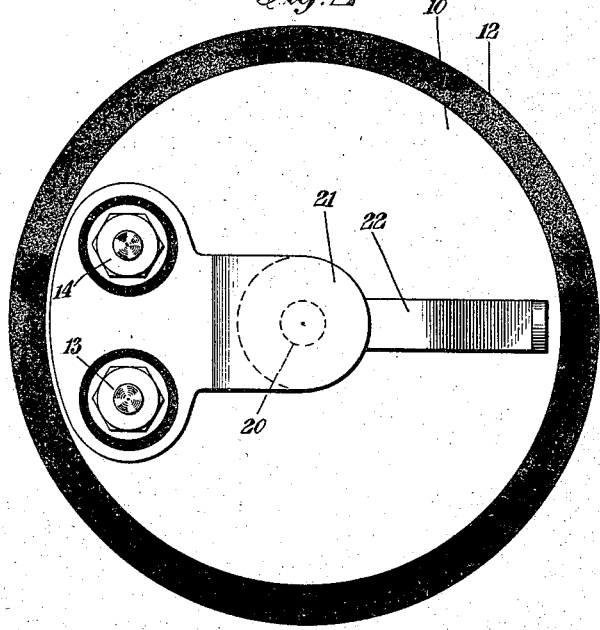

Figure 1 is a vertical section through the receiving apparatus, and Fig. 2 is a plan thereof.

Similar characters of reference designate corresponding parts throughout the several views.

Referring to the drawings, 10 designates a suitable casing adapted to inclose the mechanism and is fitted with a diaphragm 11 held thereto by a cap 12, of insulation, as is well understood.

13 and 14 designate the terminal connections which are electrically connected to windings or coils 15 surrounding permanently magnetized pole pieces 16 coöperating with the diaphragm 11.

It is the object of the present invention to afford means whereby the distance between the poles 16 of the magnets and the inner face of diaphragm 11 may be varied to correspond to the distances between communicating stations. To this end, the said magnets are not directly secured to the casing 10 but are carried by a plate 17 to which they are rigidly attached. This plate, in turn, is fixedly secured to one end of a rod or shaft 18 provided at its outer end with a micrometer thread and guided in an elongated bearing 19 to prevent wabbling of said shaft. The bearing is fixed to the casing and the outer end of the shaft fits a recess 20 provided therefor in a bracket 21 also fixed to the said casing and extending over the end of said shaft. Between the outer face of the bearing 19 and the inner face of the bracket 21 and about the threaded end of the rod 18 is mounted a lever 22, having a nut 23 threaded to fit the said threaded end of the rod 18. Suitable friction washers 24 are included between the nut 23 and the lever 22 and the respective bracket and bearing. To prevent turning of the plate 17, a pin 25 is provided, the same extending inwardly from the casing into the said plate. As the lever 22 is moved, rod 18 is correspondingly advanced or retracted and carries with it the magnets to accordingly vary the distance between the poles 16 and the diaphragm 11.

In view of the elongated bearing 19, the rod, and with it the magnets, are rigidly held in position; and, moreover, the threads at its outer end may be accurately cut to afford a uniform and desired degree of reciprocation of said magnets. The design and arrangement of the entire structure is such that there will be no wabbling of the magnets and their position relative to the diaphragm may be accurately maintained and reproduced after various adjustments, all of which is particularly desirable as well as necessary in connection with the use to which the apparatus is to be put.

I claim:

1. In receiving apparatus of the character set forth: a casing; suitable magnetic means therein, and a diaphragm coöperating therewith; and means to vary the distance between said magnetic means and said diaphragm, comprising a reciprocable shaft connected with said magnetic means to reciprocate the same, said shaft being threaded at its outer end, an elongated bearing for said shaft and secured to the said casing, means to prevent turning of said magnetic means, a threaded nut engaging the threaded end of said shaft, and a lever connected therewith to move said nut whereby the said shaft is reciprocated accordingly.

2. In receiving apparatus of the character set forth: a casing; suitable magnetic means therein, and a diaphragm coöperating therewith; and means to vary the distance between said magnetic means and said diaphragm, comprising a reciprocable shaft connected with said magnetic means to reciprocate the same, said shaft being threaded at its outer end, a bracket extending over said casing and provided with a recess for the threaded end of said shaft, an elongated bearing for said shaft and secured to the said casing, means to prevent turning of said magnetic means, a threaded nut engaging the threaded end of said shaft, and a lever connected therewith to move said nut whereby the said shaft is reciprocated accordingly.

Signed at New York, in the county of New York, and State of New York, this 3rd day of December A. D. 1913.

JOSEPH S. LEACH.

Witnesses:
EDWARD W. F. MAMMEN,
E. G. RYAN.